United States Patent [19]

Pratscher et al.

[11] Patent Number: 4,890,410

[45] Date of Patent: Jan. 2, 1990

[54] AUTOMATIC FISHING HOOK SETTING DEVICE

[75] Inventors: Andrew J. Pratscher, Hobart; Michael Grynecki, East Chicago, both of Ind.

[73] Assignee: Speedhook Specialists, Inc., Hobart, Ind.

[21] Appl. No.: 303,121

[22] Filed: Jan. 30, 1989

[51] Int. Cl.⁴ ............................................... A01E 97/12
[52] U.S. Cl. ............................................. 43/15; 43/37
[58] Field of Search ..................... 43/15, 34, 37, 105

[56] References Cited

U.S. PATENT DOCUMENTS

| | | | |
|---|---|---|---|
| 677,655 | 4/1901 | Gray | 43/15 |
| 2,203,618 | 6/1940 | Paxton | 43/15 |
| 3,182,418 | 5/1965 | Hawks | 43/15 |
| 3,559,326 | 1/1969 | Henderson | 43/15 |
| 4,141,168 | 2/1979 | Nishi | 43/15 |

Primary Examiner—Richard K. Seidel
Assistant Examiner—Michael William Starkweather
Attorney, Agent, or Firm—Thomas W. Tolpin

[57] ABSTRACT

A special fishing rig is provided with a unique swivel, split ring, latch, and leg assembly, which repeatedly catches more fish.

18 Claims, 2 Drawing Sheets

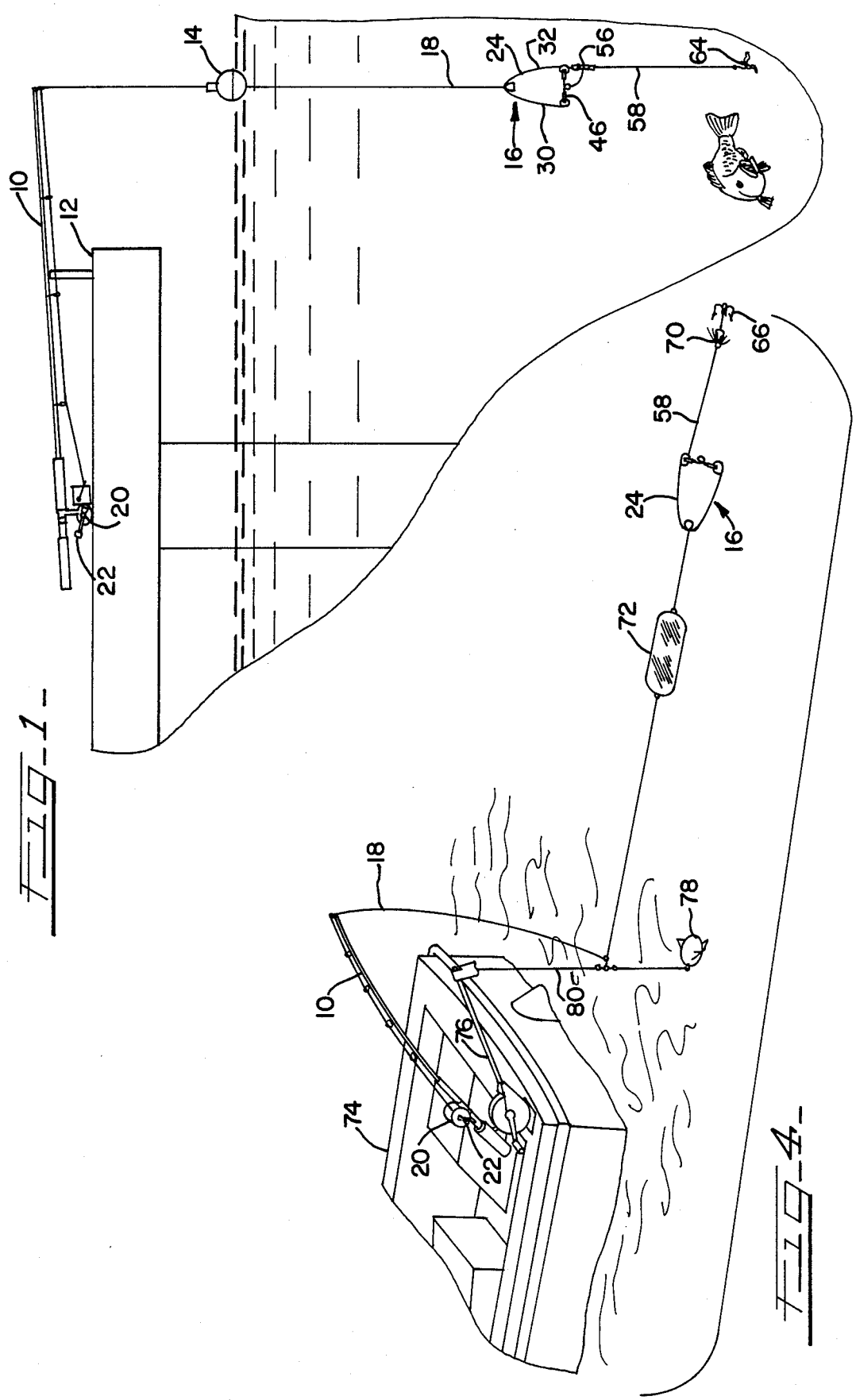

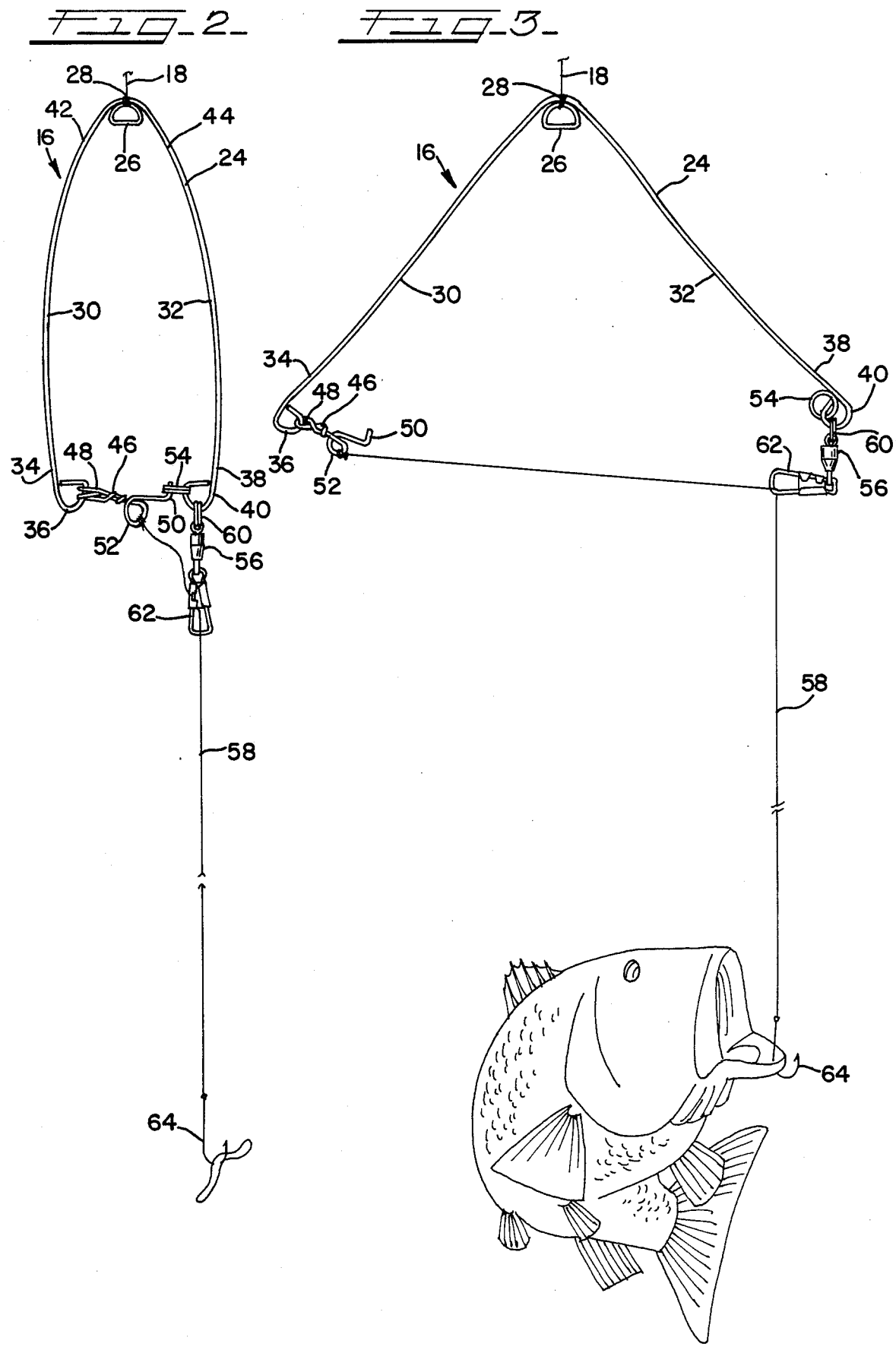

AUTOMATIC FISHING HOOK SETTING DEVICE

BACKGROUND OF THE INVENTION

This invention relates to fishing equipment and, more particularly, to a fishing rig.

Fishing is a very popular pastime, hobby, and sport among men, women, and children alike. Throughout the United States, Canada, and other areas of the world, people enjoy fishing.

There are many methods of fishing: still fishing, drift fishing, float fishing with a bobber, bottom fishing, trolling, and casting from the shore, a pier, or a boat, to name a few.

Enthusiastic and avid fisherman have invested time and money to purchase better, new, and improved fishing equipment in an effort to catch more fish. The demand for fishing equipment and supplies has become so great that the fishing industry has grown to a multi-billion dollar industry.

Over the years a variety of fish hook-setting devices, angling devices, and other fishing equipment have been developed. Typifying some of the prior art fish hook-setting devices, angling devices, and other fishing equipment are those shown in U.S. Pat. Nos. 2,203,618; 2,504,822; 3,559,326; 4,043,069; and 4,141,168. These prior art fish hook-setting devices, angling devices, and fishing equipment have met with varying degrees of success.

It is, therefore, desirable to provide an improved fishing rig which is easy-to-use, convenient, and effective.

SUMMARY OF THE INVENTION

A improved fishing rig is provided which is effective and efficient to catch more fish. Advantageously, the improved fish rig is fun, easy-to-use, convenient, compact, and inexpensive.

To this end, the novel fishing rig has a leg assembly with a line-attachment portion, such as a spring loop with a rounded apex, for attachment to a line connected to a fishing rod. The leg assembly has pivotable legs, preferably spring biased wire legs, which move from a closed, cocked, latched position to a diverging, normally open position for hooking a fish. The lower or distal ends of each of the legs can terminate in a stationary foot comprising a rigid loop.

A ring or ringlet, preferably a split ring, is slidably and pivotally connected to one of the legs, preferably to the leg's foot or rigid loop. A guide member, preferably in the form of a snap swivel or barrel swivel, is slidably and pivotally connected to the same leg, most preferably to the leg's foot or rigid loop. The guide member or swivel is spaced away and separately moveable from the split ring and has an eyelet positioned below the split ring.

Pivotally attached to the other leg, preferably to the other leg's foot or rigid loop, is a latch assembly to latch the ring when the rig is in the cocked latched position. The latch assembly preferably has a latch at one end, an end loop providing a pivot point at the other end, and a central intermediate loop for attachment to a hook-engaging line. The hook-engaging line passes through the eyelet of the guide member or swivel and is fixedly connected and securely attached at one end to the latch assembly, preferably to the central intermediate loop, and at its other end to a hook, such as a single hook, double hook, treble hook, or weedless hook. The hook-engaging line can comprise monofilament line, nylon line, or wire line.

The fishing rig is particularly useful for still fishing for pan fish with a bobber, such as from a pier, the bank, shore, or an anchored or drifting boat. For still fishing, it is preferred to use a single or weedless hook. Natural bait such as worms, night crawlers, maggots, bee-moth, peelers, crayfish, leaches, salmon eggs, shiners, or minnows are preferred in fresh water streams, rivers, ponds, and lakes. Shrimp and squid are preferred in salt water. Heavier gauge wire should be used when fishing for bass, salmon, trout, muskie, northern pike, catfish, and other freshwater and salt water fish over two pounds. If desired, in order to counterbalance the current, one or more split shots, rubber cored leaded weights, slidable barrel weights, pyramid weights, or other weights can be attached to the hook-engaging line or the fishing rod-line to lower the fishing rig to the desired depth. The fishing fig can also be used for ice fishing.

The fishing rig is also useful for casting and trolling either a naked hook, baited with pork rine or a natural bait, or a lure, such as a lead headed jug or plug with one or more hooks, such as a treble hook, doulbe hook, single hook, or weedless hook. The fishing rig can be trolled from a rod or outriggers along the surface with a weight or planing board. The rig can also be trolled by a boat below the surface with a downrigger, wire line, leaded line or a Dipsy Diver or Pink Lady type diving board. A fish attractor such as a polished metal flasher or #00, #0, or #1 size silver, orange, or green metal dodger can be attached in proximity to the fish rig when trolling.

A more detailed explanation of the invention is provided in the following description and appended claims taken in conjunction with the accompanying drawings.

BRIEF DESCRIPTION OF THE DRAWINGS

FIG. 1 is a diagrammatic view of still fishing from a pier with a fishing rig in accordance with principles of the present invention;

FIG. 2 is an enlarged front view of the fishing rig in a closed, cocked, latched position;

FIG. 3 is an enlarged front view of the fishing rig in a diverging, spread, normally open position; and FIG. 4 is a diagrammatic view of trolling with the fishing rig.

DETAILED DESCRIPTION OF THE PREFERRED EMBODIMENTS

Whether a fishing rod 10 (FIG. 1) is held in the fisherman's hand, or placed in a rod holder, or on the shore or a pier 12 when still fishing with a bobber 14, the number of fish caught and the enjoyment of fishing can be greatly increased with the special fishing rig 16. The fishing rig 16, which is also sometimes referred to as a speed hook, bait saver, fish hook setting device, angling device, assembly, or unit, is tied, attached, or clipped directly, or by means of a swivel, to the fishing line 18 between the bobber 14 and fishing rig. The fishing line 18 is connected to the reel 20 of the fishing rod. The rig 16 can be raised and lowered by cranking (turning) the handle 22 of the fishing reel 20 of the fishing rod.

As best shown in FIGS. 2 and 3, the fishing rig 16 has a resilient, semi-rigid, wire, n-shaped, or inverted U-shaped or V-shaped, unitary, flexible leg assembly 24. The leg assembly 24 has an upper central spring loop or coil 26 which is connected and attached by a knot 28 or swivel to the fishing line 18 and has symmetrical, bendable, bifurcated, elongated legs 30 and 32 which diverge outwardly and are integrally connected to the spring loop 26. The legs 30 and 32 are moveable from an arcuate convex, outwardly bulging, bent, retracted, cocked, biased, spring-loaded, latched, and trapping, closed position as shown in FIG. 2 to an expanded, spread, diverging, released, normally open hook-setting position for hooking a fish as shown in FIG. 3 and vice versa. The spring loop 26 biases and urges the legs 30 and 32 to the normally open hook-setting position. In the preferred embodiment, the legs 30 and 32 are the same size and are substantially straight in the open position. The legs include a left leg 30 and a right leg 32. The left leg 30 has a lower end portion 34 which terminates in a left annular foot comprising a latch-supporting wire loop 36. The right leg 32 has a lower end portion 38 which terminates in a right annular foot comprising a swivel-supporting wire loop 40.

The upper portions 42 and 44 of the legs 30 and 32 are positioned about 60 degrees from each other in the closed position (FIG. 2) and the lower portions 34 and 38 of the legs are positioned from about 10 to 25 degrees from each other in the closed position. In the open position (FIG. 3), the legs 30 and 32 are positioned from about 75 to 90 degrees from each other. For best results, the legs 30 and 32 are formed of 0.041 inch to 0.067 inch gauge spring steel music wire or piano wire. If desired, other gauge steel or other materials can be used.

Pivotally connected to the latch-supporting loop 36 of the left leg 30, is a unitary substantially rigid wire latch assembly 46. The latch assembly 46 can be made of the same gauge wire as the leg assembly 24. The latch assembly 46 has a terminal loop or coil 48 at its left end and a hooked finger at its right end comprising an L-shaped latch 50. In order to facilitate smooth tripping of the rig and unhooking (unlatching) of the latch 50, it is preferred that the latch have a substantially deburred rounded, tapered, bullet-shaped head or a chamfered head. The latch assembly 46 also has a downwardly extending, central intermediate line-engaging loop 52, which is positioned between and integrally connected to the terminal loop 48 and the latch 50. The latch 50 is cantilevered and extends from the line-engaging loop 52 and latches and lockingly engages a moveable metal split ring 54 or ringlet when the rig 16 is in the closed latch position (FIG. 2). The latch 50 can be bent, if desired, with a pliers, slitted roll pin, or other tool to adjust the latching force or releasability of the latch 50.

The split ring 54 is slidably linked and pivotally connected to the swivel-supporting loop 40 of the right leg 32. The split ring 54 is latchingly connected and lockingly engaged to the latch 50 when the rig 16 is in the closed latched position as shown in FIG. 2 and is spaced away and unlatched from the latch 50 when the rig 16 is in the open position as shown in FIG. 3.

Slidably positioned adjacent the split ring 54 on the swivel-supporting loop 40 of the right leg 32, is a guide member 56. The guide member 56 preferably comprises a metal swivel. The swivel 56 can be a barrel swivel, but most preferably comprises a snap swivel for ease of insertion and removal of the hook-engaging line 58. The swivel 56 has an upper ringlet 60 which is slidably linked and pivotally connected to the swivel-supporting loop of the right leg 32. The swivel 56 also has a downwardly extending snap member 62 or latch which closes to form a lower line-receiving eyelet that provides a guide to annularly surround, guide, and slidably receive the hook-engaging line 58. The snap member 62 can be opened to insert or remove the line 58. The line 58 can be inserted or threaded, however, in the guide without opening the snap member 62.

The hook-engaging line 58 slidably extends through the eyelet of the swivel 56 and is securely tied and fixedly connected at its upper end to the intermediate line-engaging loop 52 of the latch assembly 46 near the left leg 30. The lower end of the hook-engaging line 58 is securely tied and fixedly connected to a single hook 64, or other type of hook such as a weedless hook, double hook, or treble hook 66 (FIG. 4).

When still fishing with a bobber 14 (FIG. 1) for panfish under two pounds, such as for bluegill, crappie, brook trout, etc., it is preferred for best results that the leg assembly 24 (FIG. 2) of the fishing rig 16 be constructed of 0.041 inch gauge spring steel, that the hook-engaging line 58 and fishing line 18 be from about 1 to 8 pound test monofilament line, most preferably 4 pound test monofilament line, and that the hook 64 comprise a single number 6 hook. When still fishing with a bobber 14 (FIG. 1) for freshwater fish over 2 pounds, such as for salmon, steelhead trout, German Brown trout, muskie, northern pike, bass, etc., or for saltwater fish over 2 pounds, such as red snapper, sea bass, drum, cobia, mackerel, bluefish, etc., or when casting or trolling the rig 16 for such fish as in FIG. 4, it is preferred that the leg assembly 24 of the fishing rig 16 be constructed of 0.067 inch gauge wire, that the hook-engaging line 58 and fishing line 18 be from 10 to 20 pound test line, most preferably 15 to 17 pound test line, and that a stronger single, double, treble, or weedless hook or ice hook be used. The hook-engaging line 58 can be of a stronger pound test line than the fishing line 8, if the hook-engaging line 58 is to serve as a shock leader. Monofilament line, nylon line, or wire line can be used as desired for the hook-engaging line 58 and/or the fishing line.

A lure 70 (FIG. 4), such as a lead head jig with a single hook or a plug, such as a J-plug, Rapala or Rebel type diving or floating plug, Northport Nailer or other spoon, skirted buzz baits, flies, squids, Mepps-type spinner, etc, can be tied or otherwise secured to the hook-engaging line 58 with one or more single or treble hooks 66, when trolling or casting the jig 16. A fish attractor 72, such as a polished metal flasher or dodger can be attached to the fishing line 18 above the rig 16 when trolling the rig 16 at a desired depth below a boat 74 with a downrigger 76 and/or downrigger ball or weight 78.

In use, when the fishing rig 16 is used for still fishing with a bobber 14, such as shown in FIG. 1, the rig 16 is squeezed, bent, or otherwise moved to the retracted cocked closed position as shown in FIG. 2 and the latch 50 is latched (hooked) to the split ring 54. The hook 64 can be baited with natural or artificial bait, either before or after the rig 16 is moved to the cocked closed position. After the hook 64 is baited and the rig 16 is moved to the cocked closed position, the rig is cast or placed at its desired location in the water. When a fish strikes the baited hook 64, it will pull the hook-engaging line 58 via the hook 64 causing the latch 50 to be pulled out of the split ring 54. Thereafter, the rig 16 will instantly spring and trip to its expanded open position as shown in FIG. 3, jerking the hook upwardly to simultaneously hook the lip or jaw of the fish. Once the fish is hooked, the presence and force of the fish is transmitted through the fishing line 18 to the fisherman and the fisherman can reel up the fish.

In order to cast or trolled the fishing rig 16 from a boat, such as shown in FIG. 4, the rig 16 is squeezed, bent, or otherwise moved to the retracted, cocked, closed position and the latch 50 is latched to the split ring 54 as described above. The hook may or may not be baited as desired by the fisherman, if a lure 70 is used. The fishing rig is then cast or lowered with a downrigger 76 to the desired depth. When the fish strikes the hook 66, it will pull the hook-engaging line 58 causing the latch 50 to be pulled out of the split ring 54, so that the rig 16 will snap open to its expanded position causing the hook to jerk towards the rig 16 and hook the lip or jaw of the fish in a manner similar to that described previously. Once the fish is hooked, the force of the fish will release the fishing line 18 from the downrigger wire line 80, causing the tip of the rod 10 to jerk or move, signaling the presence of a fish and the fisherman can reel up the fish.

It was unexpectedly and surprisingly found that the fishing rig 16 caught much more fish and had many more strikes than a similar rod, reel, and fishing line used without the rig but with a similar hook and bait. The fishing rig was extensively tested over a period of time and achieved (caught) seven times more fish than the same rod, reel, line, hook, and bait without the rig.

EXAMPLE 1

A six foot, two piece fiberglass fishing rod with six metal guides and a cork handle, equipped with a Johnson spin casting closed face reel, Sabra model 545, eight pound monofilament Trilene line, and a single number 6 True-Tun hook was tested for still fishing with a bobber with and without a fishing rig 16 in fishing waters of Indiana, as was a 5½ foot single piece pistol grip graphite rod equipped with a Shimano open face reel, eight pound monofilament Trilene line, and a single number 6 True-Tun hook and a 5½ foot single piece Spiral graphite rod equipped with a Garcia Mitchell open face reel, model #300A, eight pound monofilament Trilene line, and a single number 6 True-Tun hook. The leg assembly was constructed of 0.041 inch gauge spring steel music wire as was the latch assembly. Plastic ball bobbers and vertical, slidable, balsa wood bobbers were used. The rods were tested over 75 times during a period of three months. During the test period, numerous bluegill, sunfish, large and/or small mouth bass, rock bass, carp, catfish and bull head were caught. The fishing rig 16, however, caught over 7 times more fish than a similar similar same rod, reel, line, hook and bait without the rig. On some occasions, when fishing with b-moth (bee moth larvae), over 15 fish per hour were caught with the rig 16.

EXAMPLE 2

A Japanese fish catcher was constructed to have the structure described in Nishi U.S. Pat. No. 4,141,168. The Nishi Japanese fish catcher and applicants' fishing rig 16 were constructed of the same gauge wire and were tested on the said day and location with the equipment and under the conditions of Example 1. Similar types of fish were caught. Applicants' fishing rig, however, caught over three times as many fish than a similar rod, hook, bait, and line equipped with the Nishi Japanese fish catcher In conclusion, applicants have invented a novel fishing rig which is enjoyable and successful in catching more fish than prior art methods and devices. Among the many advantages of the novel fishing rig are:
1. Superior fish catching ability.
2. Outstanding hook-setting device.
3. Quality construction.
4. Economical
5. Simple to use.
6. Fun.
7. Easy to store.
8. Convenient.
9. Efficient.
10. Effective.

Although embodiments of the invention has been shown and described, it is to be understood that various modifications and substitutions, as well as rearrangements of parts, can be made by those skilled in the art without departing from the novel spirit and scope of this invention.

What is claimed is:

1. A fishing rig, comprising:
   leg means for attachment to a fishing rod-line, said leg means having pivotable legs, said legs being biased from a cocked latched position whereby the latch position connects the base end of said biased legs to a diverging normally open position for hooking a fish;
   ring means slidably connected to one of said legs;
   latch means pivotally connected to the other leg for latching said ring in said latched position;
   guide means pivotally connected to said one of said legs, said guide means defining an eyelet positioned below said ring means;
   hook means; and
   hook-engaging line means passing through said eyelet, said line means having one end fixedly connected to said latch means and another end fixedly connected to said hook means.

2. A fishing rig in accordance with claim 1 wherein said leg means has a spring loop with a rounded apex for attachment to said fishing rod-line.

3. A fishing rig in accordance with claim 1 wherein each of said legs has a stationary foot comprising a rigid loop, one of said loops being pivotally connected to both said ring means and adjacent said guide means and the other loop being pivotally connected to said latch means.

4. A fishing rig in accordance with claim 1 wherein said latch means has one end defining a pivot point, another end providing a latch, and an intermediate central portion positioned between said pivot point and said latch comprising a loop securely connected to said line means.

5. A fishing rig in accordance with claim 1 wherein said said ring means comprises a ringlet.

6. A fishing rig in accordance with claim 1 wherein said said ring means comprises a split ring.

7. A fishing rig in accordance with claim 1 wherein said said guide means comprises a swivel selected from the group consisting of a snap swivel and a barrel swivel.

8. A fishing rig in accordance with claim 1 wherein said wherein said hook means is selected from the group consisting of a single hook, a double hook, a treble hook, and a weedless hook.

9. A fishing rig in accordance with claim 1 wherein said wherein said line means is selected from the group consisting of monofilament line, nylon line, and wire line.

10. A fishing rig, comprising:
- a resilient wire leg assembly having an upper central spring loop for attachment to a line of a fishing rod and substantially symmetrical elongated legs integrally connected to said spring loop, said legs being moveable from an expanded spread released normally open hook setting position for hooking a fish to an arcuate convex bent cocked biased closed latched trapping position, said spring loop urging said legs to said open position, said legs being substantially the same size and including a left leg and a right leg, said left leg having a lower end portion terminating in a latch-supporting loop, and said right leg having a lower end terminating in a swivel-supporting loop;
- a unitary wire latch assembly pivotally connected to said latch supporting loop, said unitary wire latch assembly having a terminal loop at one end pivotally and slidably linked to said latch-supporting loop, an intermediate line-engaging loop integrally connected to said terminal loop, and a hooked finger at the other end comprising a latch cantilevered and integrally extending from said intermediate line-engaging loop;
- a moveable split ring comprising a ringlet slidably linked and pivotally connected to said swivel-supporting loop, said split ring latchingly connected and lockingly engaging said latch in said closed position and being spaced from said latch in said open position;
- a swivel having an upper swivel ringlet slidably linked and pivotally connected to said swivel-supporting loop in proximity to said split ring and having a lower line-receiving eyelet providing a guide, said eyelet being positioned lower than said split ring and said intermediate line-engaging loop in said closed position;
- a hook; and
- a hook-engaging line slidably extending through said eyelet of said swivel, said hook-engaging line having a lower end connected to said hook and an upper end connected to said intermediate line-engaging loop of said latch assembly.

11. A fishing rig in accordance with claim 10 wherein said latch comprises a substantially L-shaped latch with a substantially rounded deburred head.

12. A fishing rig in accordance with claim 10 wherein said resilient wire leg assembly comprises from about 0.041 inch to about 0.067 inch gauge spring steel music wire.

13. A fishing rig in accordance with claim 12 wherein said wire latch assembly and said resilient wire comprise similar gauge spring steel wire.

14. A fishing rig in accordance with claim 10 wherein said legs comprises bifurcated legs with upper portions, said upper portions of said leg being positioned about 60 degrees from each other in said closed position, said lower ends of said legs being positioned from about 10 degrees to about 25 degrees from each other in said closed position, and said legs being spaced from about 75 degrees to about 90 degrees from each other in said open position.

15. A fishing rig in accordance with claim 10 including a bobber connected to the line above said upper central spring loop, said resilient wire leg assembly comprising substantially 0.041 inch gauge spring steel wire, said hook-engaging line comprising from about 1 pound to about 8 pound monofilament line, and said hook comprising a single number 6 hook.

16. A fishing rig in accordance with claim 10 including a a lure connected to said hook, said resilient wire leg assembly comprising substantially 0.067 inch gauge wire, said hook engaging line comprising from about 10 pound to about 20 pound line.

17. A fishing rig in accordance with claim 16 wherein said lure comprises a plug and said hook comprises a treble hook.

18. A fishing rig in accordance with claim 16 wherein said lure comprises a lead headed jig and said hook comprises a single hook.

* * * * *